Patented July 14, 1936

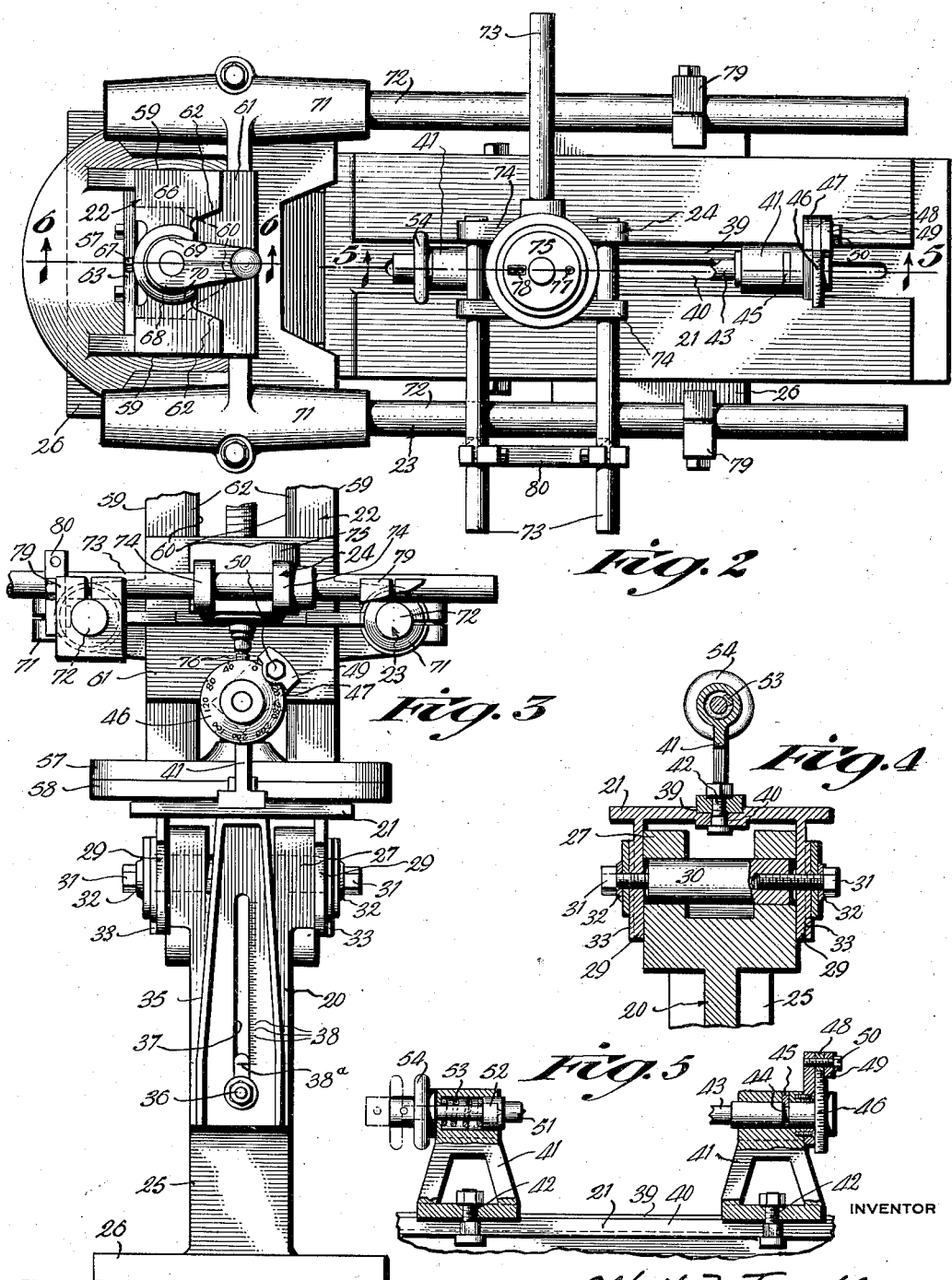

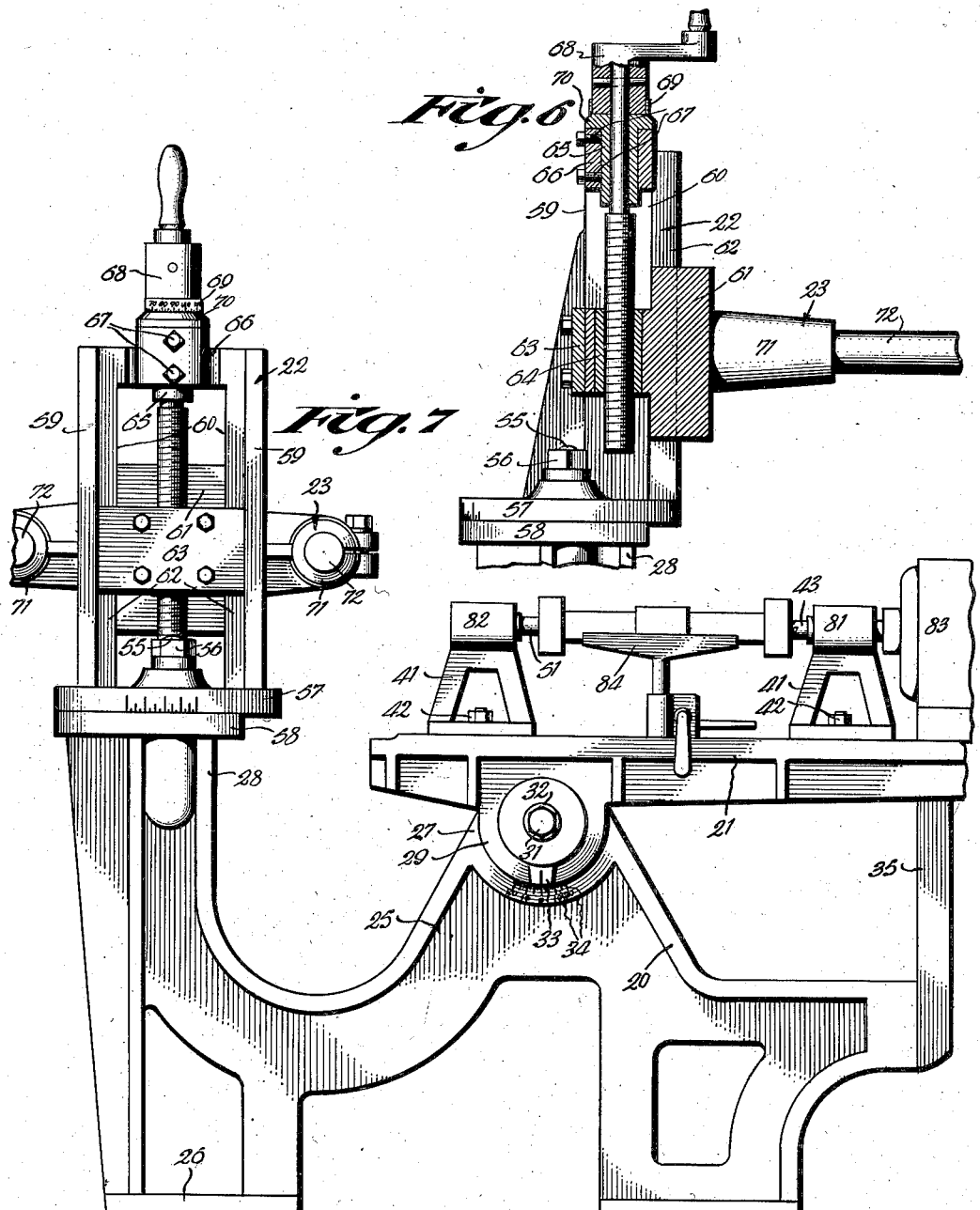

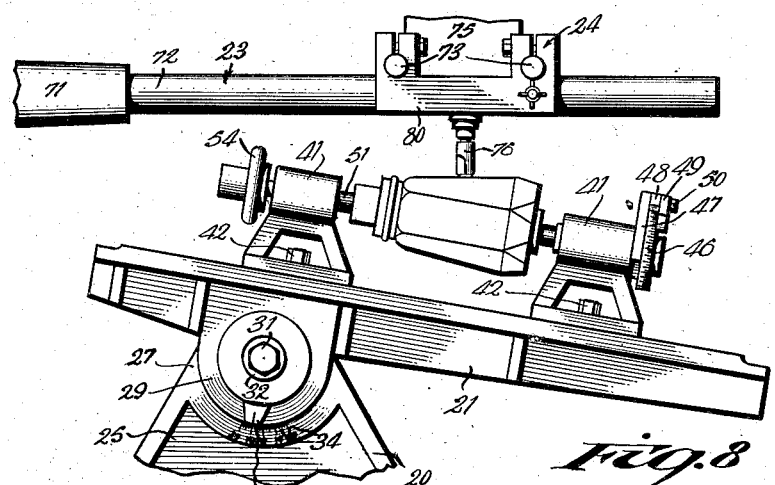
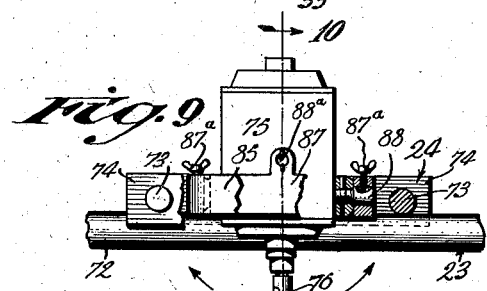
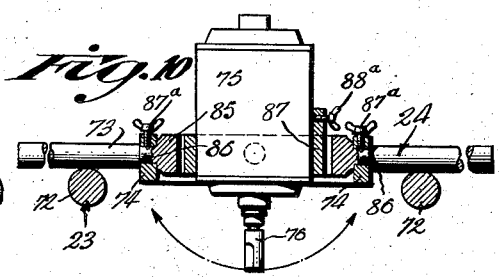
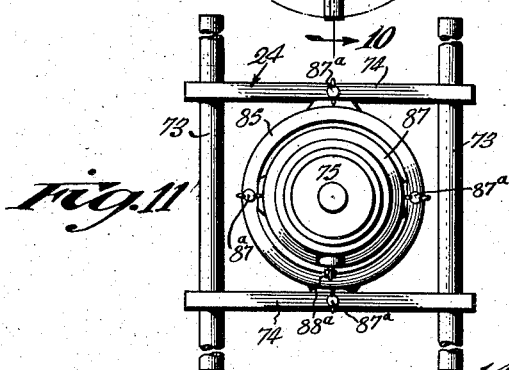
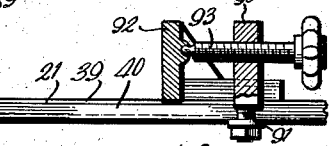
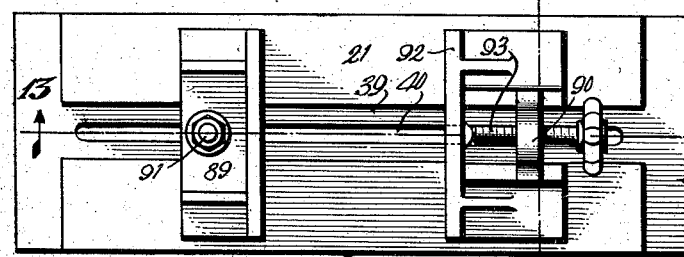

2,047,603

UNITED STATES PATENT OFFICE 2,047,603

WOODWORKING MACHINE FOR MAKING MOLDS, MODELS, ETC.

Albert F. Tremblay, Union City, Ind., assignor to Overmyer Mould Company, Winchester, Ind., a corporation of Indiana Application May 31, 1934, Serial No. 728,336

5 Claims. (Cl. 144—134)

This invention relates to woodworking machinery and is particularly directed to a machine for making irregular models, molds, patterns and the like.

It is an object of this invention to provide an improved machine of the above type; in which a motor driven cutter head and tiltable work support are provided, the relation of which can be varied for the purpose of making a wide range of angular cuts in the work; in which an adjustable support is provided for the table; in which the cutter head is universally movable for making curved cuts or is movable for feed in different directions for straight or angular cuts in selected horizontal planes; in which the feeding movements are made easily due to reduction of friction; in which the cutter head can be completely turned away clear of the work; in which stops or guides are provided on the cutter head mounting for selectively controlling the range of movement of the cutter head and guiding the same; in which indexing mechanisms are provided associated with a swinging support for the cutter head, with the table, and with a stock for supporting the work on the table; and in which the work-holding parts on the table can be interchanged for mounting the work in various manners.

Other objects and further advantages will be more fully apparent from a description of the accompanying drawings, in which:

Figure 2 is a top plan view of the machine.

Figure 3 is a fragmentary end view thereof.

Figure 4 is a sectional view taken on line 4—4, Figure 1, illustrating the adjustable mounting for the work supporting table.

Figure 5 is a sectional view taken on line 5—5, Figure 2, detailing the work-holding stocks.

Figure 6 is a sectional view taken on line 6—6, Figure 2, detailing the elevating screw for the arm.

Figure 7 is a side view of the machine taken similar to Figure 1, but showing the arm swung away from the table and showing stocks including a driven spindle in position on the table and a tool rest whereby the machine can be used for wood-turning purposes.

Figure 8 is a fragmentary side view of the machine, illustrating the work table in tilted position and the cutter tool engaging a piece of work.

Figure 9 is a fragmentary view of a cutter head, showing a universal mounting therefor.

Figure 10 is a sectional view taken on line 10—10, Figure 9.

Figure 11 is a top plan view of the cutter head of Figure 9.

Figure 12 is a plan view of the work table showing a vice or clamping mechanism mounted thereon.

Figure 13 is a sectional view taken on line 13—13, Figure 12.

Figure 14 is a sectional view taken on line 14—14, Figure 12.

Figure 1:
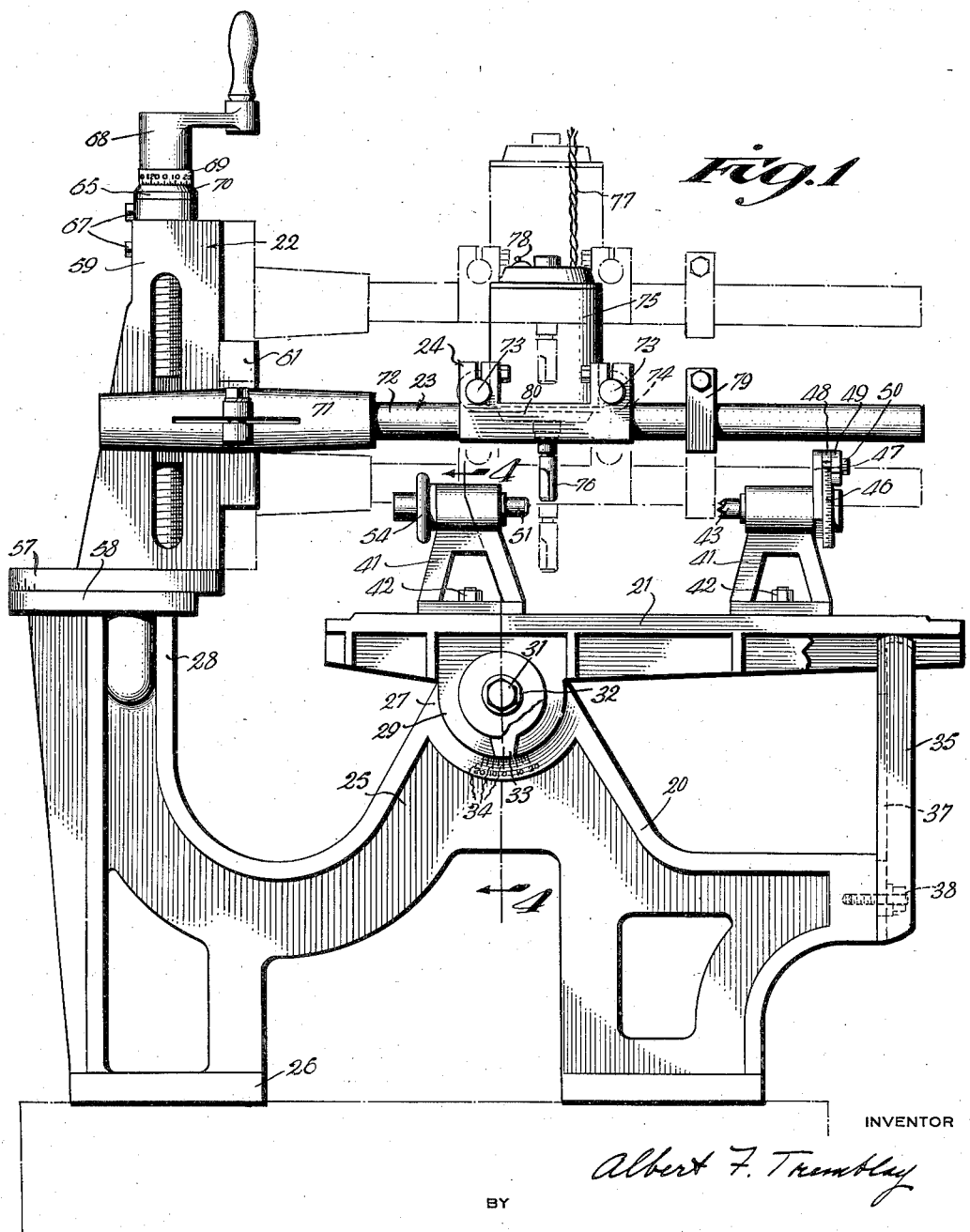
Figure 1 is a side view of the machine showing work-holding stocks embodied therein and illustrating in dot and dash lines certain adjusted positions of the arm and head thereof.

Referring to the drawings, the machine includes a base or frame 20, a table 21 tiltingly mounted on the frame for adjustment relative thereto, a column or standard 22 rotatably adjustably mounted on the frame, an arm 23 vertically adjustably mounted on the column, and a tool or cutter head 24 translatably mounted on said arm. The base or frame is of relatively narrow single wall construction (see Figure 3) and is suitably reinforced by ribs 25. Wide feet 26 are included. The base provides two upwardly extended lug portions, one, namely 27, providing a pivot journal for the table and the other, namely 28, providing a pedestal for the standard or column. The table 21 is of ribbed construction providing a flat top structure and downwardly extended curved lugs 29 straddling the upwardly extended journal lug portion 27 of the base (see Figure 4).

A short pivot or rock shaft 30 is journalled in the lug of the base. Screws 31 are engaged axially into the ends of this rock shaft through the lugs of the table for rotatably mounting the table relative to the lug of the base for the previously described tilting mounting. Suitable washers 32 are placed under the screws. The pivot lug of the base includes a radially extended pointer portion 33 including an index mark thereon. These washers are rigidly fixed in position relative to the table and the index mark is adapted to move relative to graduated index marks 34 on the lug of the base adjacent the lugs of the table (see Figure 1). The graduations are circumferentially arranged so that the index mark on the lug 29 of the table will register therewith to indicate the degree of tilt of the table (see Figure 8).

A standard or support element 35 is fixed to the outer end of the base and supports the outer end of the table when the table is in horizontal position. A bolt 36 rigidly fastens the support element to the base.

The opening in the standard or support element 35 through which the bolt 36 passes is in the form of a vertical slot 37. By virtue of the provision of this slot the standard is vertically adjustable for supporting the table in tilted position as shown in Figure 8. The upper end of the standard is rounded, as viewed from the side, for contact at diffetent angles. This is for the reason that the contact of the table with the top of the standard is at different angles as the table is set in various tilted positions.

Graduations 38 are located along one edge of the slot and are readable in relation to an indicator element 38ᵃ. The indicator element 38ᵃ is elongated and fits in the slot. It is traversed by the bolt and is therefore a fixed part in relation to which the standard is moved vertically. Accordingly, there are two gauges for determining the degree of tilt of the table for setting and resetting the table to desired angles.

The table includes a longitudinal recess 39 in its top surface and a longitudinal slot 40 entirely through the table centrally of the recess. The groove and slot provide for attachment of the work-holding fixtures. The fixtures, as shown principally, are stocks having spindles axially engaging the work at opposite ends.

As shown in Figure 5, each stock 41 has a base slidably fitted in the groove of the table and carries an attaching bolt 42 having its head below the slot and passing through the slot with a nut screwed on its upper end above the base of the stock for rigidly fixing the stocks in selected spaced positions.

In the instance of the right hand stock, a rotatably adjustably mounted spindle 43 is provided having a serrated outer face adapted to rotatively engage the work. The body of the spindle includes an annular groove 44 engaged by a cross key 45 in the stock preventing axial displacement of the spindle. The spindle incorporates a head 46 having graduation marks in its peripheral surface.

A combined pointer and clamping plate 47 is rigidly fixed against the end of the stock about the axis of the spindle and under the head of the spindle, and projects radially beyond the periphery of the head.

An arcuate spacer element 48 fits about the periphery of the head against the extended plate, and a clamp block 49 engages against the spacer and the face of the head. A screw 50 passes through the clamp block, spacer, and into the fixed plate 47 for clamping the block against the face of the head. The clamp block functions as a pointer including a mark for this purpose registrable with any one of the graduations of the head.

The other stock 41 includes a centering spindle 51 axially aligned with the rotatably adjustable spindle. This spindle has a center point for engaging into the end of the work, and is counter-turned to provide an enlarged portion 52 slidably mounted in a counterbore. A coil spring 53 under compression is mounted between the enlarged portion and the shoulder afforded by the counterbore. A manipulating element or handwheel 54 is fixed on the outer end of the spindle and limits spring urged inward movement thereof. This spindle can be displaced for releasing the work by translating the same outwardly into the dot and dash line position shown in Figure 5.

The column or standard 22 is adjustably rotatably secured on the frame by means of a bolt 55 having its head engaged within the frame. This bolt is screw-threaded and projected upwardly centrally of the circular column base and a nut 56 is engaged on the threads holding the column in position of rotative adjustment. The outer periphery of the circular column base 57 has graduations thereon moving relative to a mark on the circular support pad 58 of the base.

This column incorporates spaced vertical arms 59, 59. Each of said arms has a vertically disposed slideway 60 on its inner side. The arm 23 of the machine provides an attaching lug 61 having tapered sides engaging adjacent tapered surfaces 62 of the arms, and a portion projecting into the space between the mentioned ribs of the arms. A gib plate 63 is secured to this portion, projected between the ribs of the arms, and overhangs the outer sides of the slideways 60, 60. This construction therefore vertically slidably mounts the arm. A nut 64 is fixed in the arm and an elevating screw traverses said nut. The elevating screw is supported in a bearing 65 in the cross or connecting wall 66 at the top of the arms.

The bearing is in the form of a headed sleeve fixed in this cross arm or wall by means of screws 67. The plain reduced portion of the elevating screw rotatively passes through this bearing. The elevating screw is supported by means of an actuating element 68 fixed to the upper end of the elevating screw and resting on the head of the bearing. A sleeve 69 including graduations is secured around the lower end of the hub of the manipulating lever for movement relative to a mark on a tapered edge 70 of the fixed bearing.

The vertically slidably mounted arm 23 includes elongated supporting sleeve-like lugs 71, one at each side of the column. A round rod 72 is fixed in each lug, these rods projecting in parallelism and providing spaced supports for the cutter head. The rods are of approximately the same length as the table and are spaced apart a distance greater than the width of the table.

The cutter head 24 is supported on and between these spaced rods. It comprises spaced cross rails 74 directly supporting a motor 75. Round support rods 73 extend at right angles from each side of the cross rails 74 crosswise to the rods 72, 72. Two of these rods are used at one side and one at the other (see Figure 2). This arrangement results in a three point contact for stability in case of unevenness as opposed to a four point contact which would rock in case the rods 72 and 73 were not in parallel planes. The axis of the motor is vertically disposed, whereby its tool-holding chuck is projected downwardly. The support rods rest crosswise on the rods of the arm. The motor shaft carries a cutter tool 76 at its lower end. Suitable wiring 77 is extended to the motor from above and a starting switch 78 is incorporated on the top of the motor.

The range of movement of the cutter head is controlled by means of stops 79, 79, one on each of the rods of the arm 72, 72, and a third one 80 mounted on and connecting the rods 73, 73, of the head at the outside of one of the rods of the arm. The cutter head is moved for making cuts on work supported rigidly between the stocks on the table. These movements are accomplished by sliding the carriage of the head on the rods of the arm.

Since the contact between the head carriage and the rods of the arm is between rods at right angles to each other, it will be apparent that the area of contact is reduced to a minimum, the three points establishing the contact being aptly described as point contacts. Therefore, movements of the cutter head are made with comparative ease since friction is reduced to the absolute minimum possible without using anti-friction roller or ball bearings.

The stops 79, 79, on the rods of the arm can be set out at the same positions on their respective rods 72, 72, so that the cross feed of the cutter head can be directly at right angles to the axis of the work. Oblique or angular cross cuts are made by setting the stops 79, 79, out of alignment and sliding the head back and forth against these disaligned stops. In the case of longitudinal cuts on the work, the stop 80 on the rods of the head is set so as to space the tool relative to the width of the table for engaging the work at the proper portion. The cutter head is then moved longitudinally of the arm with the stop 80 engaging against the side of one of the rods thereof for maintaining the head in squared relation relative to the work.

The work supporting table 21 carrying the stocks can be tilted by moving the end support 35 and loosening the pivot 30 of the table, the amount of tilt being selected by reading the index. An operation with the table tilted is shown in Figure 8, for instance in making a tapered cut or bevelling an end. After the operator has cut a tapered job of the character shown, he can note the position of the standard 35 by taking a reading at the graduation thereon for the purpose of re-setting the table to the particular inclination as in cases where a duplication of the first piece of work is desired some time later.

The centering means which makes a positive rotative adjusting connection to the work can be rotated and readings taken through the index included therewith for setting the work at predetermined rotated positions.

As shown in Figure 7, the arms can be swung entirely clear of the table and work position by movement through 90°. If desirable, a headstock 81 and tailstock 82 can be mounted on the table with a motor 83 included in the headstock for driving work and performing turning operations. A tool rest 84 is readily applied to the table or the turning can be performed by means of the cutter head tool operated relative to the rotating work.

As shown in Figures 9 to 11, a universal swinging mounting is provided for the motor and tool at the cutter head. For this purpose the cross straps 74, 74, carry a ring 85 disposed in the plane of the cross straps and the rods of the head. This ring has trunnions 86 supporting it in the cross straps or rails. A second ring 87 is provided mounted within the first, this ring being coaxial with the first and carrying the motor axially thereof. This ring also includes trunnions 88 journalled in the outer ring at right angles to the trunnions 86 of the outer ring. These trunnions can all be fastened securely in position by means of winged nut headed screws 87a and likewise the motor is fastened in the inner ring by means of a wing nut headed screw 88a.

Through the provision of this double ring mounting, the motor has full floating support and the tool can be swung on an arc for making curved cuts in the work.

Also, if it is desirable, clamps 89, 90, can be provided on the support table as shown in Figures 12 to 14. The clamp elements are secured in position in the groove of the table by means of bolts 91. One of the clamps, namely 90, carries a slide member 92 facing the other clamp and operated by means of a screw 93 passing through the mentioned fixed clamped element.

Having described my invention, I claim:

1. In a woodworking machine, a base, a column rotatably mounted on said base, an arm vertically adjustably mounted on said column, a table mounted on said base below said arm, a headstock having a rotatable spindle and a tailstock in axial alignment therewith mounted on said table, said arm comprising spaced horizontal support rods, a cutter head mounted on said spaced rods including spaced support rods resting crosswise on said rods of the arm, and a vertically disposed motor and cutter unit supported on said spaced rods of the head, whereby said cutter head is slidable in any direction on said support rods with respect to work located between said headstock and tailstock mounted on said table, said column rotatably adjustable whereby work between said headstock and tailstock may be turned to a configuration without interference from said cutter head and said horizontal support rods.

2. In a woodworking machine, a base, a column rotatably mounted on said base, an arm vertically adjustably mounted on said column, a table supported on said base adjacent said column, a tailstock and a headstock having a rotatable but clampable spindle mounted on said table in axial alignment, and a cutter head mounted on said arm, said arm including spaced rods, said cutter head including spaced rods resting crosswise on the rods of the arm, stops on said rods of the arm for limiting and guiding the movement of the cutter head, and a stop on the rods of the cutter head adapted to engage a rod of the arm for limiting and guiding cutter head movement on the arm whereby said cutter head is movable on the rods of the arm in a space limited by the stops on the rods of the arm and the stop on the rod of the cutter head for cutting on work mounted between said headstock and tailstock transversely of the longitudinal axis thereof.

3. In a machine of the class described, a work table, an arm extended over said table comprising a pair of rods in a horizontal plane pivotally supported to swing entirely clear of said table, a cutter unit adjustably mounted on said arm, said unit including a motor, a tool driven by said motor, a frame embracing said motor, in which frame said motor is pivotally mounted whereby the motor and tool can be swung on an arc, and rods annexed to said frame to constitute a three-point suspension for said unit on the rods of said arm extended over said table, said table including means wherein work may be located and held for operation by said cutter unit.

4. In a woodworking machine for making molds, models, patterns and the like, a base, a table mounted on said base pivotally for angular adjustment, means for holding said table in any given position, a column rotatably mounted on said base, an arm suspended from said column adjustable vertically with respect thereto and positioned to swing clear of said table upon pivotal rotation of said column, comprising, a pair of rods in a horizontal plane, said arm extending over said table, means on said table for positioning work, a cutter unit mounted on the rods of said arm for operation on work positioned on said table comprising a motor, a tool driven by said motor, a frame embracing said motor to which the latter is pivotally annexed, and rods annexed to said frame to constitute a three-point suspension for said cutter unit on the rods of said arm, which latter include adjustable stops whereby the cutter unit may be confined on the rods in a space limited by said stops on said arm for direction of the cutter unit in a predetermined path with respect to the work.

5. In a woodworking machine, a base, a work table supported on said base, a column mounted on said base adjacent said work table pivoted for rotation about its longitudinal axis, spaced horizontal support arms vertically adjustably carried by said column normally to project over said table but free to swing clear thereof by rotation of said column, a cutterhead unit mounted for three point support on said support arms including spaced support rods resting crosswise on said spaced arms, and a motor and cutter tool unit pivotally supported on said crosswise rods, said motor and cutter unit swingable through a path transverse to the axis of the work table when said cutter unit is mounted thereover.

ALBERT F. TREMBLAY.